United States Patent
Sun

(12) 
(10) Patent No.: US 6,320,990 B1
(45) Date of Patent: Nov. 20, 2001

(54) HIGH-PERFORMANCE ELECTRO-OPTIC INTENSITY MODULATOR USING POLYMERIC WAVEGUIDES AND GRATING MODULATION

(75) Inventor: De-Gui Sun, Ottawa (CA)

(73) Assignee: Nu-Wave Photonics, Inc., Ottawa (CA)

( * ) Notice: Subject to any disclaimer, the term of this patent is extended or adjusted under 35 U.S.C. 154(b) by 0 days.

(21) Appl. No.: 09/518,054

(22) Filed: Mar. 2, 2000

(30) Foreign Application Priority Data

Mar. 5, 1999 (CA) .................................................. 2265015

(51) Int. Cl.$^7$ ...................................................... G02F 1/295
(52) U.S. Cl. ..................................... 385/9; 385/2; 385/14; 385/37; 385/131
(58) Field of Search ................................ 385/9, 87, 2, 3, 385/4, 8, 12, 14, 129–132

(56) References Cited

U.S. PATENT DOCUMENTS 5,533,151 * 7/1996 Leonard .................................... 385/3
5,854,864 * 12/1998 Knoesen et al. ........................ 385/30
6,226,423 * 5/2001 Minakata et al. ......................... 385/2

* cited by examiner

Primary Examiner—Phan T.H. Palmer
(74) Attorney, Agent, or Firm—Friedrich Kueffner

(57) ABSTRACT

A high-performance electro-optic intensity modulator using two polymeric waveguides having a high extinction-ratio modulation process is implemented by the coupling-out effect of induced grating modulation. The two waveguides can be either single-mode or multi-mode, even highly multimode. The inducing of a modulated grating-coupler in a waveguide channel makes the coupling between two waveguides become unidirectional and the coupling efficiency can be achieved to a very high value in theory. The two waveguide channels in this intensity modulator may have large dimensions, so the device can support either single-mod or multi-mode operation. The electro-optic waveguide intensity modulator may be used either as a single optical modulator/switch or as a waveguide modulator/switch array for fiber-optic communication.

4 Claims, 1 Drawing Sheet

HIGH-PERFORMANCE ELECTRO-OPTIC INTENSITY MODULATOR USING POLYMERIC WAVEGUIDES AND GRATING MODULATION

FIELD OF THE INVENTION

The present invention provides a high power and high extinction-ratio electro-optic intensity modulator utilizing grating coupling and poling effects of nonlinear polymers. It provides an optical signal modulator for optical communication systems, optical interconnects, and large scale fiber-optic network systems.

BACKGROUND OF THE INVENTION

To date, communication and computer systems have played a dominant role in many fields. At the same time, among various microstructure optoelectronic technologies, integrated optics represents a promising approach in these advanced information processing areas. In these systems, Si-based logic an memory integrated circuitry continues its evolution toward higher speed and enhanced functionality, with a resulting decrease in feature size and increase in process complexity. Future electronic systems will require on-chip signal conversion between electrical, optical and microwave media to reach the speed and functionality projections. Thus a radically different alternative concept exploits the use of photons, instead of electrons, to carry information in what is commonly referred to as "optical interconnects." One implementation of this strategy relies on the integration of crystal-, semiconductor- or polymer-based optoelectronic interconnects on a host Si substrate, and thus requires feasible crystal-, semiconductor- or polymer-based optoelectronic technologies in order to produce Si-based photonic modulators for optical waveguide interconnects.

Although the technologies for some electro-optic (EO) waveguide devices based on inorganic materials such as crystals and semiconductors have had a long developing history, the conditions for manufacturing and processing integrated optical devices are also seriously limited. While polymers, a new kind or organic nonlinear EO materials, not only have high EO nonlinearity, but also high thermo-optic (TO) effect, and have shown a promising future. Polymers generally have potentially both large EO and TO coefficients, low dielectric constants, improved thermal and temporal stability, and easy fabrication conditions. The above physical properties of polymers are very useful in constructing waveguide-type optical functional devices such as modulators and switches. A variety of polymer-based modulators aimed at providing feasible structures with high-extinction ratios have been reported. The technologies associated with packaging and interfacing with other devices are also taken as important considerations. These EO modulators focus mainly on two types: phase modulators and intensity-modulators.

For many applications, the required distance and bandwidth are within the operating parameters of both single-mode and multi-mode optical systems. High extinction-ration modulators are always needed in both single- and multi-mode fiber-optic communication systems. Therefore, the structures that can be suitable for both single-mode and multi-mode waveguide modulators will have wide applications in industry. As various fiber-optic communication systems are developed and applied in the real world, the interesting needs of high capacity in these systems require both more information channels in a single fiber and higher bit rate in each channel.

In telecommunications networks, the time-division-multiplexing (TDM) systems have been successfully used according to the SONET-standards. Among the high transmission rates for TDM systems, 2.5 Gbits/s is relatively popular according to OC-48-standard and the new transmission systems having up to 10 Gbits/s are widely applied according to OC-192-standard. The wavelength-division-multiplexing (WDM) lightwave system is the optical communication in the wavelength multiplex mode. Use of this novel approach WDM has the potential of improving the performance of the fourth generation lightwave systems by a factor of more than 1000. Recently, research on the devices and techniques for high capacity WDM systems or dense wavelength division multiplexing (DWDM) systems having effective network restoration capability, i.e., reconfigurable WDM systems, has received much more attention. In future, the hybrid fiber-optic communication systems including both ultra-high bit-rate TDM and high capacity WDM (or DWDM) systems, the routing of optical signals will be performed in optical cross-connects (OXCs). The ultra-high speed operations of the TDM systems will open a huge market for a variety of high performance EO waveguide modulators. The functions and applicability of the WDM systems will be extended by the reconfigurable structures. Therefore, the single high-performance EO waveguide switching devices and the programmable OXCs using the EO switching cells will have wide applications in fiber-optic communication.

In accordance with theoretical study, the coupling efficiency between two single-mode waveguides can be achieved a high value only at the critical coupling length, while the total coupling efficiency between two multi-mode waveguides cannot achieve a high value at all.

A paper titled "Polymeric optical intensity modulator optimized in quasi-single mode operation" by W. Hwang et al., published in Appl. Phys. Lett. 69 (11) (1996), pp. 1520–1522, discusses an EO polymer waveguide intensity modulator and is incorporated herein by reference.

SUMMARY OF INVENTION

The present invention provides a high-power and high extinction-ratio EO intensity modulator based on polymeric waveguides with unidirectional single and multi-mode coupling and a modulation mechanism.

The structures of the EO waveguide intensity modulators according to the present invention are simple and based on both single-mode and multi-mode waveguides.

An EO waveguide device according to the present invention comprises two waveguide channels. One channel is used for guiding an optical signal, called the guiding channel; while the other channel is used for coupling an optical beam out, called the coupling-out channel. These two waveguide channels are sandwiched between two cladding layers: an upper cladding layer and a lower cladding layer. A modulated grating-coupler is formed along the outside edge of the coupling-out channel. This modulated grating-coupler is induced by a grating modulation effect when a modulating electric field is applied onto the electrodes having a grating pattern. In fact, the coupling-out channel can couple the optical beam out only when the modulated grating-coupler is formed by the grating modulation effect. After an optical signal is input into the guiding channel from the input end, an optical signal will be received at the output end if the modulated grating-coupler is not formed. When the modulated grating-coupler is formed by the grating modulation effect, the optical beam can be completely coupled out and no optical signal will be received at the output end of the guiding channel. Thus a switching effect can be implemented by choosing alternative states (i.e., the unmodulated state and the modulated state) and a much higher switching contrast (i.e., the extinction-ratio) can be achieved with the structures based on the present invention.

In a preferred embodiment according to the present invention, the guiding channel should be longer than the coupling-out channel. In such case, the input, the detection and the modulation of optical signals with these optical waveguide devices can be easily and efficiently performed.

BRIEF DESCRIPTION OF THE DRAWINGS

Example embodiments of the invention are described with reference to the accompanying drawings, in which.

DETAILED DESCRIPTION OF THE INVENTION

Figure 1:
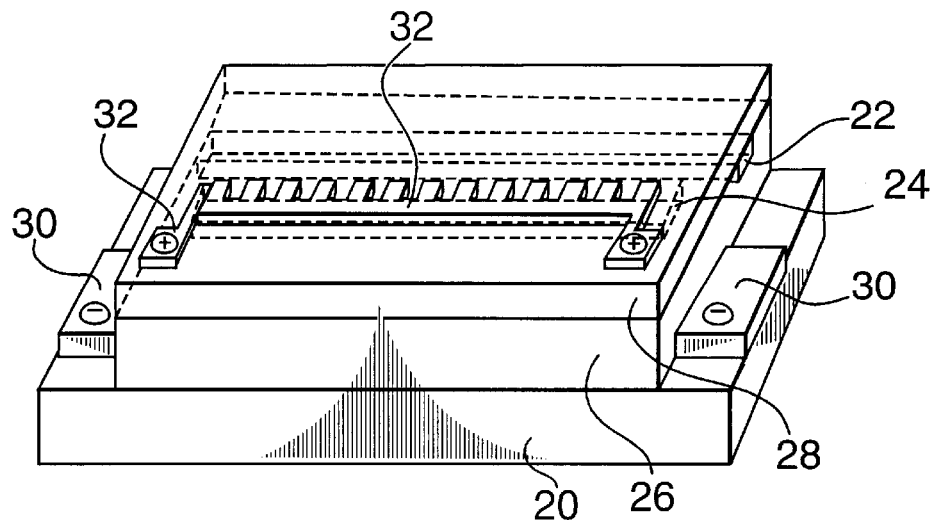
FIG. 1 is a perspective view of the structure of the intensity modulator according to the present invention.
Figure 2A:
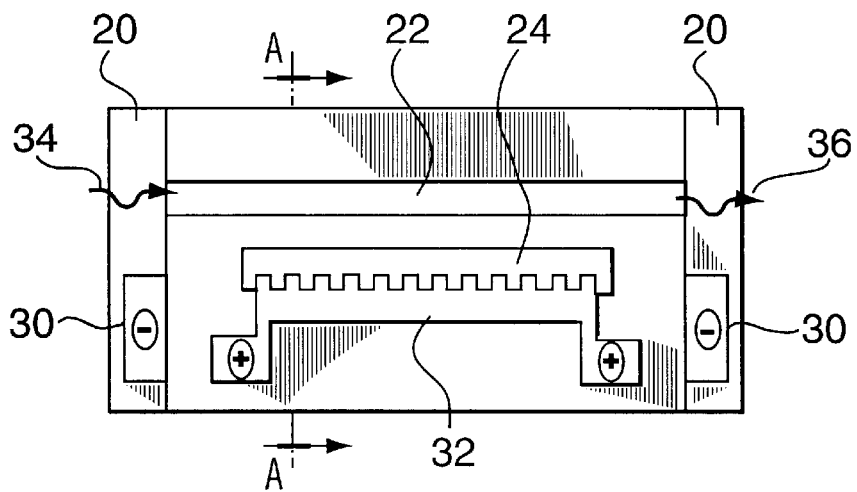
FIG. 2(a) is a top view of the modulator shown in FIG. 1.
Figure 2B:
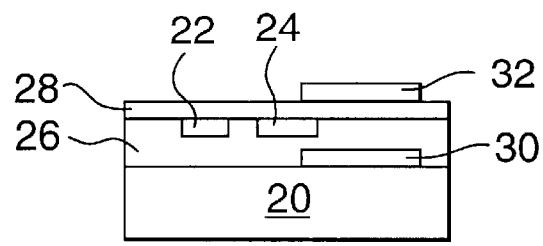
FIG. 2(b) is a vertical cross-section taken along the axis A—A in FIG. 2(a).

Referring to the drawing figures, the EO waveguide intensity modulator comprises a substrate 20, a waveguide channel 22 for guiding a light signal optical beam 34, a waveguide channel 24 for coupling the optical beam out a lower cladding layer 26, an upper EO cladding layer 28, a lower modulating electrode 30 and an upper modulating electrode 32. (It should be noted that the grating inducing electrode 32 is shown here schematically. As is known to those skilled in the art, the gratings are a few tens to a few thousand in number within a length of appr. 10–20 mm). The waveguide channel 22 is called the guiding channel and the waveguide channel 24 is called the coupling-out channel. The input optical beam 34 is coupled into the guiding channel 22, and the output optical beam 36 can then be controlled by the modulation effect of this device. This modulation effect is induced when the electric field forms an index-modulated grating-coupler in the channel 24 with a grating pattern of the upper electrode 32 cause the channel 24 to have a coupling-out effect on the optical beam 34. Thus, in the coupler based on these two waveguides, only the coupling from the guiding channel 22 to the coupling-out channel 24 is allowed, while coupling from the coupling-out channel 24 to the guiding channel 22 is eliminated, i.e. a unidirectional coupling process is achieved. The unidirectional coupling process with a modulated grating-coupler can effectively improve the optical energy transfer efficiency to be approximately 100%, thus a high switching extinction ratio can be implemented with an appropriate modulation voltage. Therefore, if no modulating field is applied onto the device, the unidirectional coupling process cannot be formed, so an optical signal can be received at the output end of the channel 22. While if an appropriate modulating field is applied to the device, the unidirectional coupling process can be formed and the entire optical beam is coupled from the channel 22 to the channel 24 and no optical signal is received at the output end. Thus, a high switching contrast is achieved.

In a waveguide coupler, unidirectional coupling is used to achieve a higher extinction ratio. To achieve this goat the primary concern is to electro-optically tune the coupling from the guiding channel 22 to the coupling-out channel 24. First we only consider the coupling between one mode (j,m) of the guiding channel 22 and one mode (j',m') of the coupling-out channel 24. If no modulation effect is applied onto the device, the modulated grating-coupler does not exist, so both the coupling process from channel 22 to channel 24 and the coupling process from channel 24 to channel 22 exist and the coupling efficiency can be expressed as $$\eta^d_{j'm',jm} = \frac{k^2_{j'm',jm}}{\psi^2_{jm,j'm'}} \sin^2(\psi_{jm,j'm'} L) \tag{1}$$

While if an appropriate modulation effect is applied to the device, the modulated grating-coupler is induced, and only the coupling from channel 22 to channel 24 exists. The unidirectional coupling can be expressed as $$\eta^d_{j'm',jm} = \sum_{n=0}^{N_L} \frac{k^2_{j'm',jm}}{\psi^2_{jm,j'm'}} \tau_{j'm'} \sin^2[\psi_{jm,j'm'}(n+1)\Delta L]\left[1 - \frac{k^2_{j'm',jm}}{\psi^2_{jm,j'm'}} \tau_{j'm'} \sin^2(\psi_{jm,j'm'} n\Delta L)\right] \tag{2}$$

where τ is the loss coefficient of the modulated grating-coupler, which is related to the index modulation $\Delta n_e$ and the groove depth $\Delta d$ of the modulated grating-coupler (i.e., $\tau \sim \Delta n_e \cdot \Delta d$), $k_{j'm',jm}$ is the coupling constant, L is the interaction length and $\Delta L$ is a selected length within which the coupled-out energy from the guiding channel 22 to the coupling-out channel 24 is uniform, and $N_L$ is defined by $$N_L = int\left(\frac{L}{\Delta L}\right) \tag{3}$$

The function $$int\left(\frac{L}{\Delta L}\right)$$

is the integer closest to $$\frac{L}{\Delta L}.$$

$\psi_{jm,j'm'}$ is defined by $$\psi_{jm,j'm'} = (k_{jm,j'm'} \cdot k_{j'm',jm} + \Delta^2_{jm,j'm'})^{1/2}, \tag{4a}$$

and $$\Delta_{jm,j'm'} = k|N_{jm} - N_{j'm'}|/2 \tag{4b}$$

where k is Boltzmann constant, and $N_{jm,j'm'}$ and $N_{jm,j'm'}$ are the effective refractive indices of the (j,m)th mode of the guiding channel 22 and the (j',m')th mode of the coupling-out channel 24, respectively. For the single-mode devices, the coupling efficiency and the unidirectional coupling efficiency can be directly calculated by using Eqs. (1) and (2), respectively. For the multi-mode devices, the total coupling efficiency and the total unidirectional coupling efficiency can be calculated by using the sum of normalized the mode-to-mode coupling efficiencies defined by Eqs. (1) and (2), respectively. As an EO modulator, the extinction ratio is completely determined by the difference of the coupling efficiencies between the unmodulated state (i.e., $\Delta n_e=0$) defined by Eq. (1) and the modulated state (i.e., $\Delta n_e=\frac{1}{2} r_{33} \cdot n_w^3 E$) defined by Eq. (2). Where $r_{33}$ is the corresponding EO coefficient $n_w$ is the refractive index of waveguide material and EO is the electric field across modulating electrodes. Note from Eq. (1) that the coupling efficiency can be zero in theory by appropriately choosing the values of $\psi_{jm,j'm'}$ and L. Note from Eq. (2) that the unidirectional coupling efficiency can be up to 100% in theory by appropriately choosing $\psi_{jm,j'm'}$, $\tau$ and L, so the difference between these two efficiencies can be achieved to be approximately 100% or a much higher value in theory. Therefore, a much higher switching contrast can be achieved with the EO waveguide intensity modulator, (For more detailed information about the theoretical study of the unidirectional coupling between two multi-mode waveguides, see *Applied Physics Letters* 72(24), 3139–3141 (1998) and *SPIE PROC*. Vol. 2994, 319–329 (1997).)

With the appropriate selections of index modulation $\Delta n_e$, grating depth $\Delta d$ and interaction length L, we can obtain a maximum unidirectional coupling efficiency $\eta^d$ of the modulated state and a minimum coupling efficiency $\eta^e$ of the unmodulated state, we thus obtain a maximum modulation depth (i.e., the switching contrast) $\eta^m=\eta^d-\eta^e$. So, the switching contrast of the intensity modulator can be achieved to a high value (>20 dB).

The waveguide modulators based on the based on the present invention are electro-optically modulated by applying the modulating voltage between the upper electrode and the lower electrode and only the waveguide material may be an EO polymer. As an EO modulator, the poling process for the polymer material needs to be done for the polymer to create the EO nonlinearity. The poling electrodes can be the same as the modulating electrodes.

The EO waveguide modulators based on the present invention can also be implemented on the EO crystals such as LiNbO$_3$. In this situation, the two modulating electrodes 30 and 32 need to be specially placed in order to produce a modulated grating-coupler along the coupling-out channel 24.

The guiding channel 22 and the coupling-out channel 24 can be either identical or nonidentical. They can be either single-mode or multi-mode. The guiding channel 22 should be longer and the coupling-out channel 24 shorter. This causes the input, the detection and the modulation of the optical signals to be performed with ease.

The optical signal is coupled into the guiding channel 22 and is coupled out from the coupling-out channel 24 when the modulating voltage is applied to the coupling-out channel 24 through the modulating electrodes.

The polymeric waveguide intensity modulators may be thermo-optically modulated by applying the modulating voltage from two ends of the upper grating electrode where the upper modulating electrode is taken as an electrical heater. In this case, the lower electrode is unnecessary and can be removed. In the thermo-optic waveguide intensity modulators according to the present invention, the waveguide material can be a polymer.

What is claimed is:

1. An optical polymeric waveguide device comprising:
   a) a substrate;
   b) two waveguide channels arranged in proximity along their lengths on said substrate in parallel;
   c) a lower cladding layer and an upper cladding layer surrounding the two waveguide channels; and
   d) a pair of modulating electrodes, one lower modulating electrode on said substrate and one upper modulating electrode on said upper cladding layer; the upper modulating electrode having a grating pattern overlapping an edge of one of said two waveguide channels along its length.

2. An electro-optical light intensity modulator, comprising:
   a) first and second lengthwise proximal planar optical waveguides formed in a polymer layer serving as a bottom cladding layer;
   b) an electro-optical (EO) polymer top cladding layer on top of the first and second planar optical waveguides;
   c) a top grating electrode on top of the EO polymer top cladding layer partially overlapping one of the first and second planar waveguides along its length;
   d) a bottom electrode, coextensive with the top grating electrode, formed at the bottom of said bottom cladding layer; and
   e) whereby application of a potential difference between the top and bottom electrodes induces a grating-coupler in the EO polymer top cladding layer and causes part or all of the light propagating through one of the waveguides to couple into the other waveguide, thereby modulating the propagating light.

3. The EO light intensity modulator of claim 2, wherein the light propagates in the first planar waveguide, which has an input and an output, and the grating-coupler is induced in the second planar waveguide.

4. The EO light intensity modulator of claim 3, wherein the second planar waveguide is completely buried in the bottom cladding layer without input or output.

* * * * *